United States Patent [19]

Zalewski

[11] Patent Number: 5,214,975
[45] Date of Patent: Jun. 1, 1993

[54] TRANSMISSION VIBRATION DAMPING

[75] Inventor: John D. Zalewski, Liverpool, N.Y.

[73] Assignee: New Venture Gear, Inc., Troy, Mich.

[21] Appl. No.: 615,906

[22] Filed: Nov. 20, 1990

[51] Int. Cl.$^5$ ............................................. F16H 57/00
[52] U.S. Cl. ........................................ 74/411; 464/73
[58] Field of Search ...................... 74/411; 464/93, 73, 464/75

[56] References Cited

U.S. PATENT DOCUMENTS

| 2,003,848 | 6/1935 | Grundy | 464/73 |
|---|---|---|---|
| 2,800,800 | 2/1953 | Dunn | 74/325 |
| 3,396,556 | 8/1988 | Giegerich | 464/73 |
| 3,398,594 | 8/1968 | Keller | 74/411 |
| 3,662,568 | 5/1972 | Kashima et al. | 464/93 |
| 3,798,924 | 3/1974 | Downey | 464/93 |
| 4,406,641 | 9/1983 | Mallet | 464/162 |
| 4,516,955 | 5/1985 | Worner et al. | 464/89 |
| 4,535,827 | 8/1985 | Seaford | 152/7 |
| 4,624,650 | 11/1986 | Hiruma et al. | 464/26 |
| 4,674,351 | 6/1987 | Byrd | 74/443 |
| 4,677,863 | 7/1987 | Filkins | 74/359 |
| 4,873,882 | 10/1989 | Goscenski, Jr. | 74/411 |

FOREIGN PATENT DOCUMENTS

| 864337 | 1/1953 | Fed. Rep. of Germany | 464/93 |
|---|---|---|---|
| 224150 | 11/1924 | United Kingdom | 464/73 |
| 642694 | 9/1950 | United Kingdom | 464/73 |
| 717421 | 10/1954 | United Kingdom | 464/73 |

OTHER PUBLICATIONS

Charles Bond Company, Flexible Insulated Couplings Catalog No. F24, 1950 pp. 4–11.

Primary Examiner—Rodney H. Bonck
Assistant Examiner—Ryan W. Massey
Attorney, Agent, or Firm—Harness, Dickey & Pierce

[57] ABSTRACT

A torsional vibration elastomeric damper coupling arrangement for a manual transmission countershaft. The coupling includes a first driven gear journalled on the countershaft and in constant mesh with the input shaft gear. A second driven gear is fixed on the countershaft and is in constant mesh with a speed gear journalled on the main shaft. The first and second driven gears each have a set of longitudinally extending axial teeth interposed to define predetermined clearances therebetween. An elastomeric damper sleeve surrounds the interposed teeth to isolate the driven gears. The elastomeric material inhibits the transfer of torsional vibration from the input shaft to the countershaft. Thus, the coupling isolates all the drive shaft speed gears, in mesh with the countershaft drive gears, from any input shaft torsional vibration.

9 Claims, 4 Drawing Sheets

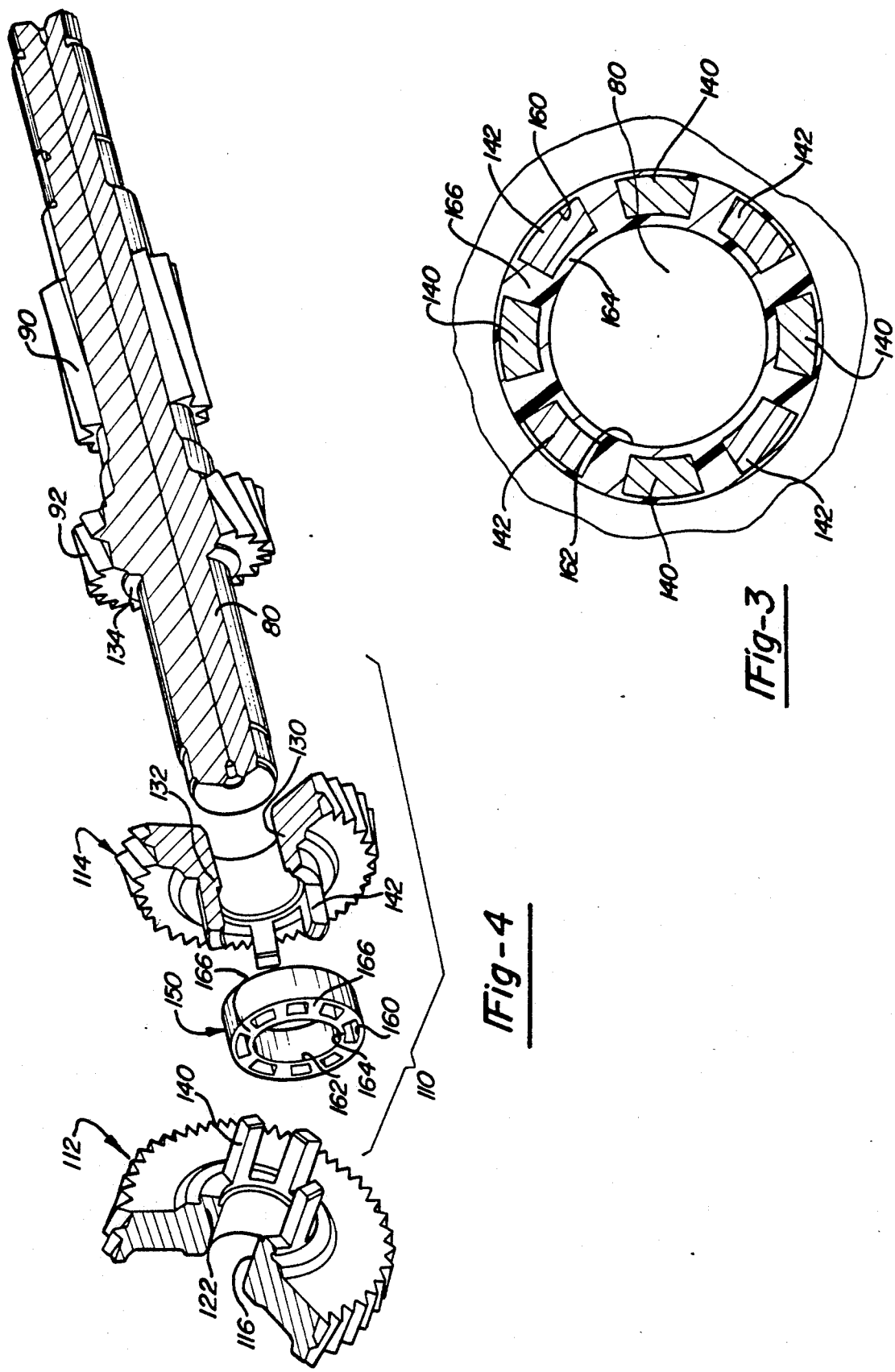

TRANSMISSION VIBRATION DAMPING

The present invention relates to a torsional vibration damping device and, more particularly, to a vibration damping device applicable for use in automotive transmissions.

Various types of torsional vibration dampers have been used in motor vehicle applications for suppressing torsional and flexural vibrations which occur in transmissions. In particular, vibration damping or absorbing devices are commonly used for obviating the transfer of torsional vibration from the input shaft to the countershaft of a manual transmission. Thus, the device is intended to isolate the main shaft speed gears, which are in meshing engagement with the countershaft output gears, from any input shaft torsional vibrations. Such isolations tend to suppress objectionable gear noise or "rattle" and limit excessive wear.

Exemplary viscous damping devices are shown, for example, in U.S. Pat. No. 4,873,882 (Goscenski) entitled Manual Transmission And Gear Rattle Damper Therefor; and U.S. Pat. No. 4,677,868 (Filkins) entitled Transmission Vibration Viscous Damper. In general, viscous damping devices utilize a viscous fluid material as the damping media for isolating and/or absorbing countershaft vibration in an attempt to eliminate gear rattle. More particularly, both of the above-noted U.S. patents utilize a sealed cavity or chamber filled with the viscous damping fluid for damping the relative rotation between the countershaft and the input shaft gear.

Alternatively, it has also been known to use mechanical coupling devices for absorbing torsional vibration. Exemplary mechanical vibration damping devices are shown for example in U.S. Pat. No. 4,624,650 (Hiruma, et al) entitled Torsional Vibration Absorber Device; and U.S. Pat. No. 4,516,955 (Worner, et al) entitled Installation For Damping Vibrations In The Drivetrain Of A Motor Vehicle.

SUMMARY OF THE INVENTION

Accordingly, it is an object of the present invention to provide an improved vibration damper coupling for a motor vehicle transmission wherein the torque transferred from the engine via the transmission input shaft to the countershaft output gears is dampened to suppress and/or absorb torsional vibration.

It is another object of the present invention to provide an improved elastomeric coupling mechanism which is designed in a compact and cost effective manner such that it can be installed on an existing manual transmission with a minimum of design changes and alterations.

The above and other objects of the present invention are accomplished by the provision of a motor vehicle transmission having a drive gear formed integral with its input shaft and in constant mesh with a first countershaft driven gear of the improved elastomeric damper coupling. The first driven gear is journally supported adjacent one end of the countershaft and has a concentric central hub portion extending inwardly toward the other end of the countershaft. A first set of axial teeth extend longitudinally in a circumferential spaced orientation from the hub of the first driven gear. A second driven gear, fixed to the countershaft, forms a second set of axial teeth extending longitudinally from its hub portion toward the first driven gear and which are spaced between the first set of axial teeth. The first and second sets of axial teeth are adapted to be loosely interposed to define radially extending openings therebetween. An elastomeric vibration damper coupling is provided between the first and second driven gears and has a plurality of circumferentially spaced and longitudinally extending apertures which are configured to accept receipt of the first and second sets of axial teeth therein. The elastomeric damper coupling surrounds the first and second sets of axial gear teeth for isolating them from the countershaft. The elastomeric damper coupling inhibits torsional vibration, backlash or oscillation rattles from being transmitted from the engine crankshaft to the transmission countershaft via the input shaft. Thus, the transmission output gears mounted on the countershaft are effectively isolated from torsional vibration of the engine crankshaft.

These and other objects and advantages of the present invention will become more apparent to those skilled in the art from the following description and drawings.

BRIEF DESCRIPTION OF THE DRAWINGS

FIG. 1A is a schematic of the transmission shift pattern;

FIG. 3 is a vertical cross-sectional view of the elastomeric coupling taken along line 3—3 of FIG. 2;

FIG. 4 is an exploded perspective view, partially broken away, of the elastomeric damper coupling and countershaft of FIG. 1.

DETAILED DESCRIPTION OF THE INVENTION

Figure 1:
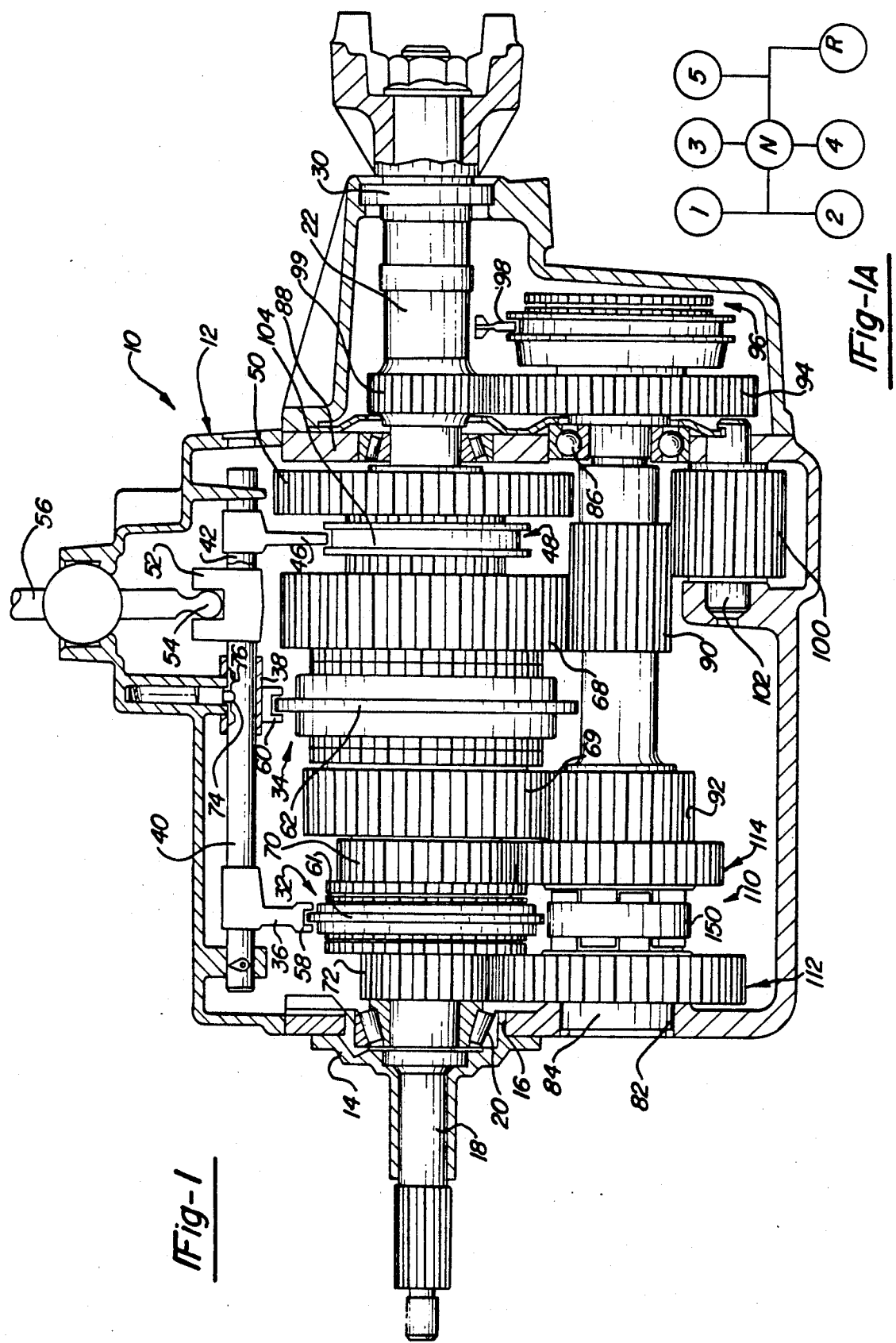
FIG. 1 is a vertical sectional view of an exemplary motor vehicle transmission, showing the internal portions in elevation, incorporating an elastomeric vibration damper coupling according to a first embodiment of the present invention.
Figure 2:
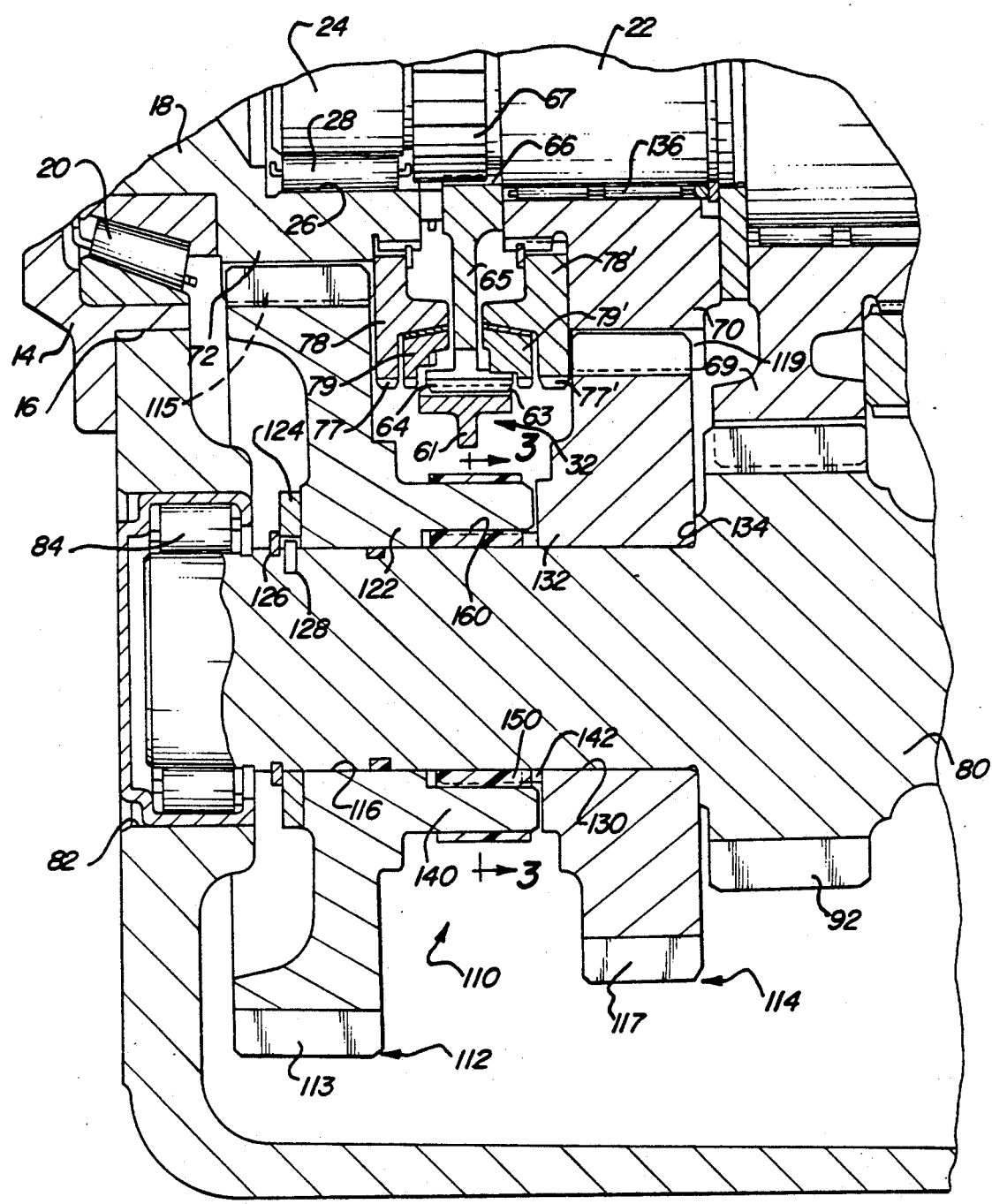
FIG. 2 is an enlarged fragmentary cross-sectional view of the elastomeric damper coupling and its associated main shaft synchronizer and countershaft portions of the transmission of FIG. 1.

Referring now to the drawings and more particularly to FIGS. 1 and 2, a motor vehicle manual transmission 10 includes a gear box housing 12 supporting an input shaft retainer 14 in a circular housing opening 16. A transmission input shaft 18, suitably connected by clutch means (not shown) to a vehicle engine crankshaft (not shown), is rotatably supported in retainer 14 by bearing assembly 20.

A transmission output shaft or main shaft 22 has its forward pilot end 24 coaxially journalled within input shaft axial blind bore 26 by suitable bearing means such as roller bearings 28. A rear bearing assembly 30 is coaxially situated with bearing assembly 20 for journally supporting the rearward end of the main shaft 22 in the housing 12.

Gear synchronizer clutch units 32 and 34, mounted on main shaft 22, are actuated by means of shift forks 36 and 38, respectively, carried on associated gear box selector rails or shafts. Thus, fork 36 is longitudinally slidable with its first selector shaft 40 while fork 38 is longitudinally slidable with a second parallel selector shaft (not shown). A third selector shaft 42 supports a reverse gear fork 46 operative for shifting a reverse synchronizer clutch unit 48 forwardly thereby engaging main shaft reverse gear 50. Each shift rail has a selector lug, such as lug 52, shown fixed on first shift rail 40. These lugs are selectively engaged by a shift finger 54 located on the lower end of a speed change lever 56. Reference may be had to U.S. Pat. No. 3,364,768 issued Jan. 23, 1968 to H. G. Powell, the specification of which is incorporated by reference herein, for details of a typical three shift rail manual transmission.

Shift forks 36 and 38 include retaining means 58 and 60, respectively, adapted to engage their associated synchronizer sliding clutch sleeves 61 and 62. It will be noted in FIG. 2 that sliding clutch sleeve 61 has internal splines 63 in constant engagement with external splines 64 of a clutch gear hub 65. Clutch gear hub 65, in turn, has internal splines 66 in constant engagement with external splines 67 on transmission main shaft 22. It is understood, that synchronizer 32 is shown merely for purposes of illustration only and any suitable type of transmission clutch mechanism could be used with applicant's elastomeric vibration damper coupling arrangement, to be described below, without departing from the fair scope of the present invention.

FIG. 1 shows the main or output shaft 22 having journalled on its surface a first speed gear 68 and a second speed gear 69 associated with first/second drive range synchronizer unit 34. Further, a third speed gear 70 and a fourth speed gear 72 are shown associated with third/fourth drive range synchronizer unit 32. Fourth speed gear 72, partially shown in FIG. 2, is formed integral with transmission input shaft 18.

To select the fourth speed drive range, shift lever 56 is manually operated to move selector shaft 40 to the left until spring loaded detent 74 engages its recess 76. This results in clutch sleeve 61 being axially moved to the left by fork 36 from its neutral position "N" to its fourth speed position "4" (see FIG. 1A). Thus, drive torque from the engine's crankshaft is transferred from input shaft 18 to main shaft 22 by means of synchronizer clutch external splines 64 engaging internal splines 77 of synchronizer left hand ratio gear 78. In a like manner, upon clutch sleeve 61 being axially moved to the right by fork 36 from its neutral position to its third speed position "3", third speed gear 70 is locked to clutch gear 65 by means of clutch external splines 64 engaging internal splines 77' of right hand ratio gear 78'. The operation of blocker rings 79 and 79' are shown and sufficiently described in the above-mentioned U.S. Pat. No. 4,677,868.

Transmission countershaft 80 has its forward end supported in housing opening 82 by means of bearing 84 while bearing 86 supports the countershaft's aft end in housing wall 88. Formed integrally with countershaft 80 are first and second range output gears 90 and 92 respectively. The gears 90 and 92 each form a portion of a torque delivery path for operation in the low or first speed range and the second speed range of transmission 10. A fifth speed or overdrive gear 94 is shown in FIG. 1 journally supported on the rearward end of countershaft 80. A fifth speed or overdrive synchronizer unit 96 is controlled by its fork 98 supported on a shift rail (not shown). Fifth speed gear 94 is meshed with fifth speed output gear 99 fixed on main shaft 22 such as by splines or which, alternatively, can be integrally formed therewith.

A reverse idler gear 100 is rotatably mounted on an idler shaft 102 as shown in FIG. 1. Reverse shift fork 46 moves reverse clutch sleeve 104 to couple reverse gear 50 to main shaft 22. Since idler gear 100 is in constant mesh with reverse gear 50, main shaft 22 is driven in its reverse counter-clockwise direction by countershaft dual first and reverse output gear 90.

With particular reference to FIG. 2, an elastomeric damper coupling, generally indicated at 110, includes first driven gear 112 and second driven gear 114 concentrically supported on countershaft 80 adjacent its forward end. First driven gear 112 has its internal bore 116 journally supported on countershaft 80 for relative rotation therewith. First driven gear 112 has its central hub portion 122 axially positioned at its left hand end by means of thrust washer 124 held by retaining snap ring 126 and radial pin 128. First driven gear 112 has its peripheral teeth 113 in constant meshing engagement with teeth 115 of fourth speed gear 72.

Second driven gear 114 is fixed on countershaft 80 by suitable means such as its internal bore 130 being sized to provide a shrink-fit mounting thereon. Second driven gear 114 has its central hub portion 132 located with its right hand face abutting a radial stepped face 134 of countershaft 80. Second driven gear 114 has its peripheral teeth 117 in constant meshing engagement with peripheral teeth 119 of third speed gear 70 which is journally supported on mainshaft 22 by means of roller bearings 136.

While first and second driven gears 112 and 114 are shown having different gearing diameters or peripheral teeth 113 and 117, respectively, their opposed hub portions 122 and 132 are substantially mirror images of each other. As best seen in FIG. 4, cylindrical hub portions 122 and 132 have formed on their opposed ends first and second sets of longitudinally extending axial teeth 140 and 142, respectively, which are concentrically spaced relative to countershaft 80. First set of axial teeth 140 are configured and spaced to be loosely fitted in a non-engaging interposed relationship with second set of axial teeth 142 of hub portion 132, as best seen in FIG. 3. As such, substantially equidistant openings are defined between the facing lateral edges of axial teeth 140 and 142.

FIGS. 2 through 4 show the improved coupling 110 to include a cylindrical sleeve 150 formed from an elastomeric material and configured to concentrically surround and generally enclose a portion of axial teeth 140 and 142. In general, a plurality of apertures 160 extend longitudinally through elastomeric sleeve 150 and are sized to receive axial teeth 140 and 142 therein such that the elastomeric material dampens torsional vibration between input shaft 18 and the output gears on countershaft 80. Coupling 110 effectively dampens out or absorbs substantially all torsional vibration, backlash, oscillation rattles, etc. which may be transmitted from the engine crankshaft via input shaft 18 to first driven gear 112 on countershaft 80. As a result, transmission output gears 90, 92, 94 and 114 and their associated main shaft speed gears 68, 69, 99 and 70 respectively, are isolated from undesirable gear noise which propagates as torsional vibrations from the crankshaft.

With particular reference to FIGS. 3 and 4, elastomeric sleeve 150 is shown to include a central bore 162 for concentrically surrounding countershaft 80 and an inner circumferential portion 164 for isolating countershaft 80 from axial teeth 140 and 142. Apertures 160 are shown to be equally spaced radially around elastomeric sleeve 150. Apertures 160 are sized to mate with the outer peripheral surfaces of axial gears 140 and 142, respectively, for preventing backlash. In addition, radially extending web portions 166 are provided to isolate axial gear teeth 140 and 142.

The preferred elastomeric material has a torsional stiffness characteristic capable of dampening the torsional vibration and converting the vibrational energy into heat which is dissipated by the transmission oil generally surrounding the exterior surfaces of cylindrical sleeve 150. It will be appreciated however, that the angular spacing and number of axial teeth 140 and 142 is merely exemplary and is not intended to be a limitation to the fair scope of the present invention.

Figure 5:
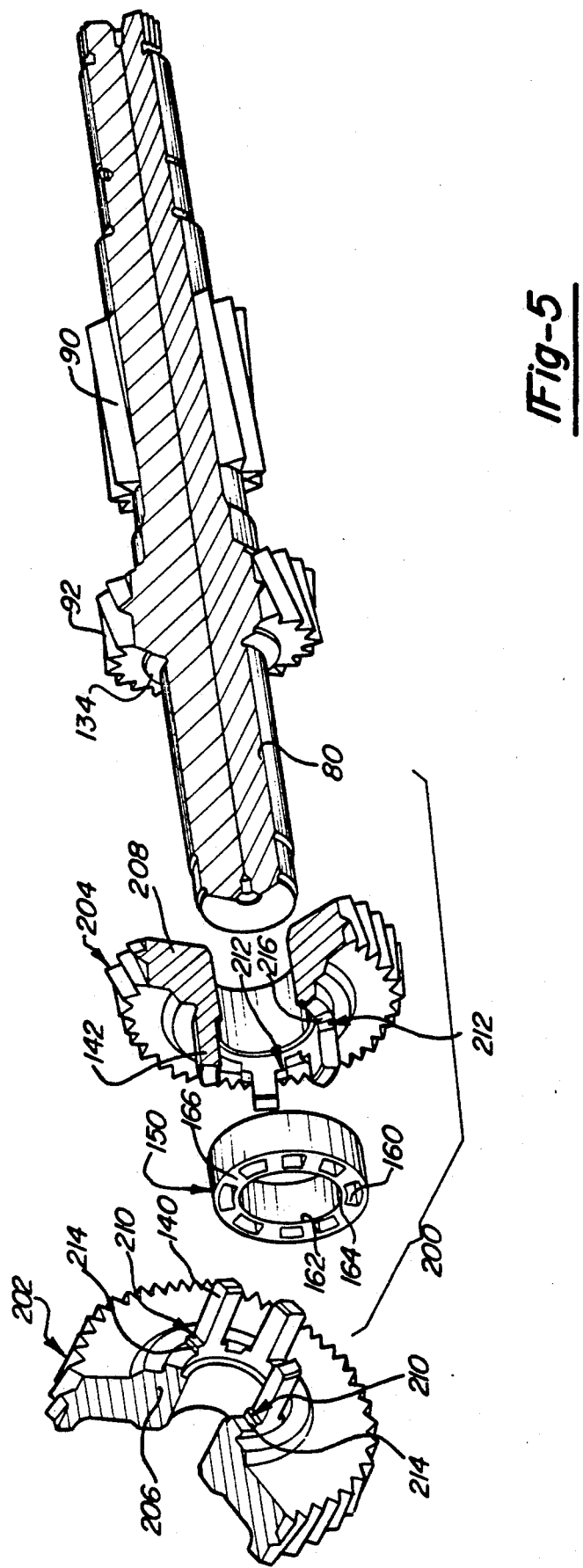
FIG. 5 is an exploded perspective view, similar to FIG. 4, illustrating an alternative embodiment of the present invention.

With reference now to FIG. 5, an alternative embodiment of a elastomeric vibration damper generally designated as coupling 200 is disclosed. Since FIG. 5 is substantially identical to FIG. 4, like numbers are used to identify like components herebefore described. First driven gear 202 and second driven gear 204 are shown to include modified hub portions 206 and 208, respectively. In particular, hub portions 206 and 208 each include longitudinally extending circumferential raised or "stepped" portions 210 and 212, respectively, formed on opposite sides of axial teeth 140 and 142, respectively. The stepped portions each define a pair of longitudinally extending end or "stop" surfaces 214 and 216, respectively. Upon assembly of cylindrical elastomeric sleeve 150 therebetween in the manner herebefore described, stop surfaces 214 and 216 tend to inhibit excessive compressive deflection of the elastomeric material for promoting prolonged life. More particularly, stop surfaces 214 are provided to engage complimentary edge surfaces of axial teeth 142 upon excessive torque loading on elastomeric coupling 150. Similarly, stop surfaces 216 are adapted to engage a complimentary edge surface of axial teeth 140 under similar conditions. Therefore, the amount of deflection of elastomeric coupling 150 is limited to a predefined level to inhibit overloading of the elastomeric material.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A manual transmission comprising an input shaft adapted to be clutched to the crankshaft of an internal combustion engine, an input gear associated with said input shaft and having peripheral teeth formed thereon; a transmission output shaft journally supported at its forward end to said input shaft, said output shaft having a speed gear formed with peripheral teeth; a countershaft having an axis of rotation parallel with the axis of rotation of said output shaft; clutch means for selectively connecting said speed gear in driving engagement with said output shaft; and a damper coupling supported on said countershaft, said damper coupling comprising a first driven gear supported on said countershaft and having peripheral teeth in constant meshed engagement with said input gear peripheral teeth, a second driven gear supported on said countershaft for rotation therewith and having peripheral teeth in constant meshed engagement with said speed gear peripheral teeth, said first and second driven gears formed with a first and second set of longitudinally extending axial teeth, respectively, arranged concentrically and in facing relationship about said axis of rotation, said first and second driven gears having opposed longitudinally extending hub portions concentrically disposed about said countershaft and upon which said first and second sets of axial teeth are formed, said first and second sets of axial teeth are adapted to be loosely interposed for defining clearance spaces therebetween and include longitudinally extending stepped surfaces adjacent said hub portions which define stop surfaces, said damper coupling further comprising an elastomeric sleeve member concentrically surrounding said countershaft and located intermediate to said opposed hub portions, said elastomeric sleeve member having aperture means configured to accept receipt of said first and second sets of axial teeth therein for isolating said first set of axial teeth from said second set of axial teeth, wherein upon said clutch means connecting said speed gear in driving engagement with said output shaft, said elastomeric sleeve acts to substantially inhibit the transfer of torsional vibrations from said input shaft to said countershaft and thus to said output shaft speed gear, said stop surfaces being adapted to inhibit excessive compressive deflection of said elastomeric sleeve upon application of torque to said input shaft.

2. The manual transmission of claim 1 wherein said first and second sets of axial teeth are equally spaced about said axis of rotation in a generally circumferential orientation and wherein said aperture means is sized to permit limited freedom of rotary movement of said first driven gear relative to said countershaft and said second driven gear.

3. The manual transmission of claim 1 wherein said elastomeric sleeve member concentrically surrounds said countershaft and defines an inner circumferential portion for isolating said countershaft from said sets of axial teeth, an outer circumferential portion surrounding the outer peripheral surface of said first and second sets of axial teeth, and a plurality of radially extending web portions intermediate said inner and outer circumferential portions and adjacent said aperture means.

4. A multiple speed ratio manual transmission comprising an input shaft adapted to be clutched to the crankshaft of an internal combustion engine, said input shaft having an input gear integrally formed thereon; said input gear formed with peripheral radial teeth and having a concentric axial opening formed in said input shaft; a transmission output shaft supported at its forward end by journal means located within said axial opening, said output shaft having a plurality of speed gears journalled thereon, each of said speed gears formed with peripheral teeth; a countershaft having an axis of rotation parallel to the axis of rotation of said output shaft; clutch means for selectively connecting said speed gears in driving engagement with said output shaft; and an elastomeric damper coupling supported from said countershaft, said damper coupling comprising a first driven gear journalled on said countershaft and having peripheral teeth in constant meshed engagement with said input gear peripheral teeth, a second driven gear fixed on said countershaft for rotation therewith and having peripheral teeth in constant meshed engagement with one of said speed gears peripheral teeth, each said first and second driven gears formed with a hub portion and a set of axial teeth which extend longitudinally from said hub portion and which are arranged concentrically about said axis of rotation, said sets of axial teeth being oppositely interposed for defining predetermined clearance spaces therebetween and forming longitudinal projections adjacent said hub portions for defining stop surfaces, said damper coupling further comprising an elastomeric sleeve located intermediate to said opposed hub portions and concentrically surrounding and isolating said sets of axial teeth for allowing limited relative rotary movement between said sleeve and said first driven gear, wherein the elastomeric material has a torsional stiffness capable of substantially inhibiting the transfer of torsional vibrations from said input shaft to said countershaft and, in turn, to said output shaft speed gears, said stop surfaces being adapted to inhibit excessive compressive deflection of said elastomeric sleeve upon application of drive torque to said input shaft.

5. The manual transmission of claim 4 wherein said sets of axial teeth are equally spaced about said axis of rotation in a generally circumferential orientation and wherein said aperture means is sized to permit limited freedom of rotary movement of said first driven gear relative to said countershaft and said second driven gear.

6. The manual transmission of claim 4 wherein said elastomeric sleeve member concentrically surrounds said countershaft and defines an inner circumferential portion for isolating said countershaft from said sets of axial teeth, an outer circumferential portion surrounding the outer peripheral surface of said first and second sets of axial teeth, and a plurality of radially extending web portions intermediate said inner and outer circumferential portions and adjacent said aperture means.

7. A multiple speed ratio manual transmission comprising an input shaft adapted to be clutched to the crankshaft of an internal combustion engine, said input shaft having an input gear supported thereon; a transmission output shaft journally supported at its forward end to said input shaft and having a plurality of speed gears journalled thereon; a countershaft having an axis of rotation parallel with the axis of rotation of said output shaft; clutch means for selectively connecting each speed gear in driving engagement with said output shaft; and an elastomeric damper coupling supported on said countershaft, said coupling comprising first and second driven gears supported on said countershaft for rotation therewith, said first and second driven gears having integral opposed cylindrical hub portions concentrically disposed about said countershaft, said opposed hub portions having longitudinally extending sets of loosely interposed axial teeth, each of said hub portions further including longitudinally extending circumferential projections located adjacent to said respective sets of axial teeth and which define transverse stop surfaces, said damper coupling further comprising an elastomeric sleeve concentrically surrounding said sets of interposed axial teeth and intermediate to said hub portions, said sleeve having aperture means receiving said sets of axial teeth to isolate said sets of teeth, a plurality of drive gears supported on said countershaft, said plurality of speed gears journalled on said output shaft in meshing engagement with an associated countershaft drive gear, said stop surfaces adapted to inhibit excessive compressive deflection of said elastomeric sleeve upon application of drive torque to said input shaft, and wherein said elastomeric sleeve is fabricated from an elastomeric material capable of substantially obviating the transfer of torsional vibrations from said input shaft to said countershaft and, in turn, to said output shaft speed gears.

8. The manual transmission of claim 7 wherein said sets of axial teeth are equally spaced about said axis of rotation and wherein said aperture means is sized to permit limited freedom of rotary movement of said first driven gear relative to said countershaft and said second driven gear.

9. The manual transmission of claim 7 wherein said elastomeric sleeve member concentrically surrounds said countershaft and defines an inner circumferential portion for isolating said countershaft from said sets of axial teeth, an outer circumferential portion surrounding the outer peripheral surface of said first and second sets of axial teeth, and a plurality of radially extending web portions intermediate said inner and outer circumferential portions and adjacent said aperture means.

* * * * *